United States Patent [19]

Androulakis

[11] 4,117,947

[45] Oct. 3, 1978

[54] INTERNAL INSULATION FOR LIQUEFIED GAS TANK

[75] Inventor: John G. Androulakis, East Patchogue, N.Y.

[73] Assignee: Frigitemp Corporation, New York, N.Y.

[21] Appl. No.: 820,853

[22] Filed: Aug. 1, 1977

[51] Int. Cl.[2] ........................ B65D 25/18; B32B 7/08; E04B 1/98

[52] U.S. Cl. ........................................ 220/435; 52/249; 52/410; 52/573; 156/71; 156/92; 220/403; 220/901; 428/313; 428/425

[58] Field of Search .................... 220/9 LG, 9 M, 9 F, 220/14, 15, 63R; 428/310, 313, 425; 52/410, 249, 573; 156/71, 92, 297, 299, 300, 301

[56] References Cited

U.S. PATENT DOCUMENTS

| | | | |
|---|---|---|---|
| 3,150,794 | 9/1964 | Schlumberger | 220/9 LG |
| 3,383,004 | 5/1968 | Closner | 428/73 |
| 3,411,656 | 11/1968 | Jackson | 220/9 LG |
| 3,489,311 | 1/1970 | Folkerts et al. | 220/9 LG |
| 3,505,769 | 4/1970 | Miron et al. | 52/249 |
| 3,562,977 | 2/1971 | Alleaume | 52/249 |
| 3,562,987 | 2/1971 | Eakin | 52/573 |
| 3,655,086 | 4/1972 | Trenner | 220/9 LG |
| 3,670,917 | 6/1972 | Nishimaki et al. | 220/15 |
| 3,707,434 | 12/1972 | Stayner | 428/313 |
| 3,753,848 | 8/1973 | Bennett | 220/9 F |
| 3,904,068 | 9/1975 | Beaujean | 220/9 LG |
| 3,931,908 | 1/1976 | Cheyney | 220/9 M |
| 3,948,406 | 4/1976 | Papanicolaou et al. | 220/9 M |
| 3,993,213 | 11/1976 | Burge et al. | 220/9 F |
| 4,021,982 | 5/1977 | Kotcharian | 220/15 |

*Primary Examiner*—William Price
*Assistant Examiner*—Allan N. Shoap
*Attorney, Agent, or Firm*—Morgan, Finnegan, Pine, Foley & Lee

[57] ABSTRACT

Multiple insulation barrier layers are held against the interior of a tank by plastic fasteners. Preferably three insulation component layers are used with a layer of fiberglass between the first and second layers to provide independent movement. Two composite membranes, one in contact with the tank and one in contact with the liquid cryogen, provide a barrier to liquid/vapor passage through the system.

14 Claims, 7 Drawing Figures

INTERNAL INSULATION FOR LIQUEFIED GAS TANK

BACKGROUND

The present invention relates to the insulation of storage tanks, either land or vessel based, which are primary or backup tanks for cryogenic fluid storage or transportation.

The invention is particularly directed to insulation on the interior of tanks which must provide not only insulation but also mechanical strength against hydrostatic pressure and load generated by the cryogenic fluid, for instance, liquefied natural gas, whose storage temperature is about −259° F. at atmospheric pressure.

SUMMARY

The present invention uses an outer membrane barrier which is exposed to liquid cryogen. The barrier is resistant to cryogenic shock and flexible at LNG temperature. An inner membrane in contact with the tank wall is impervious to water vapor and natural gas.

The insulation proper is a multi-layer assemblage positioned between the two barrier layers. The insulation advantageously includes three composite layers. Each composite includes a core of polyurethane foam and facers of aluminum foil and kraft paper.

The insulation system is supported by means of fasteners on the tank and a layer of fiberglass is used between the composite layers to provide independent movement.

DETAILED DESCRIPTION OF A PREFERRED EMBODIMENT

Figure 1:
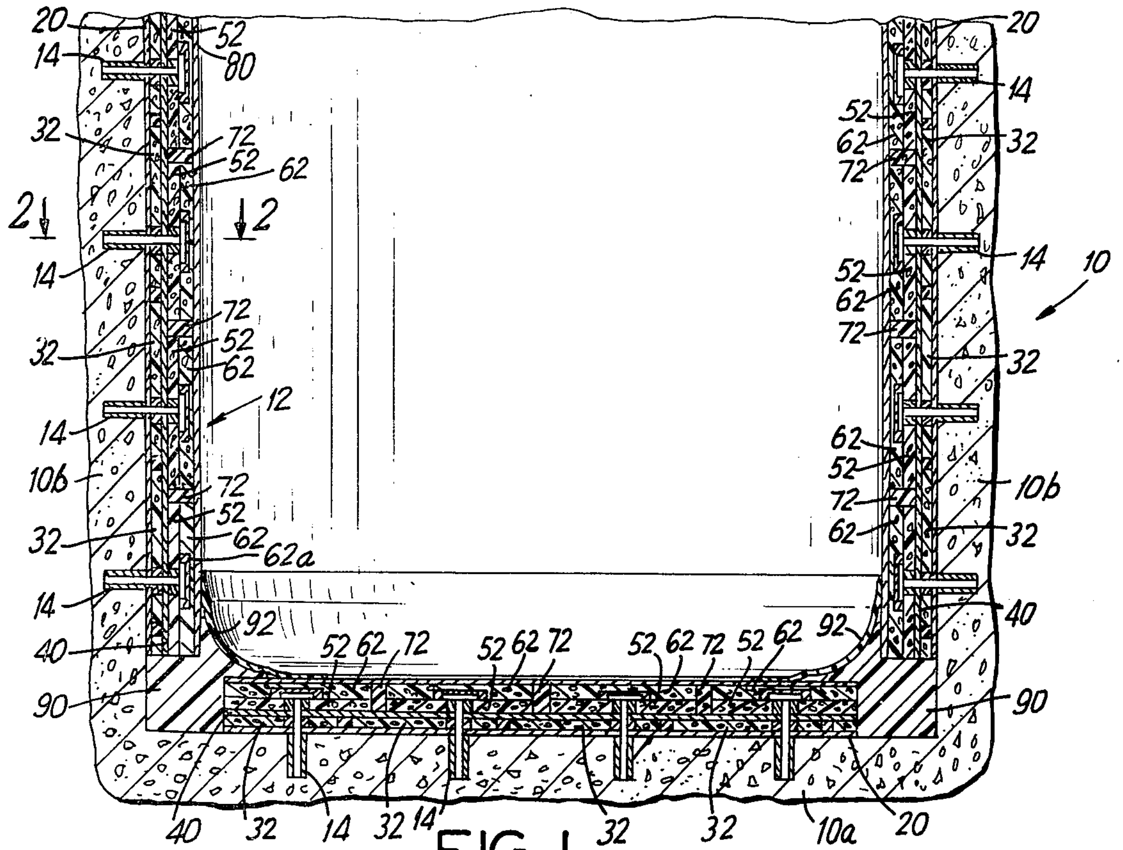
FIG. 1 is a vertical cross-section of a cryogenic tank of the dike type equipped with the insulation system of the present invention.

While this invention is susceptible of embodiment in many different forms, there is shown in the drawings and will hereinafter be described in detail a preferred embodiment of the invention, with the understanding that the present disclosure is to be considered as an exemplification of the principles of the invention and is not intended to limit the invention to the embodiments illustrated.

FIG. 1 illustrates a concrete dike retaining wall or tank 10 equipped with the insulation system of the present invention. Tank 10 is generally cylindrical in shape, having a bottom 10a and sidewalls 10b. Tank 10 is designed to contain cryogenic fluid, e.g. liquefied natural gas (LNG) in the event of failure of the primary LNG tank (not shown), which is positioned within tank 10. Tank 10 is illustrated as being concrete, but other materials, such as metal, e.g. steel, may also be used.

The insulation blanket system 12, which covers the internal surfaces of the sidewalls 10b and bottom 10a is designed to prevent the tank 10 from reaching a specified temperature, for instance −25° F. in the case of LNG, and to minimize the boil-off rate. Moreover, the design life of insulation system 12 is about 20 years, so that it is designed for extended life cycling to the environment.

Broadly, the insulation system 12 includes a multilayered panel system enclosed within two membrane elements. Advantageously, the panel system includes three layers, as described below, but the number of layers may be varied in accordance with panel thickness and temperature requirements.

Figure 2:
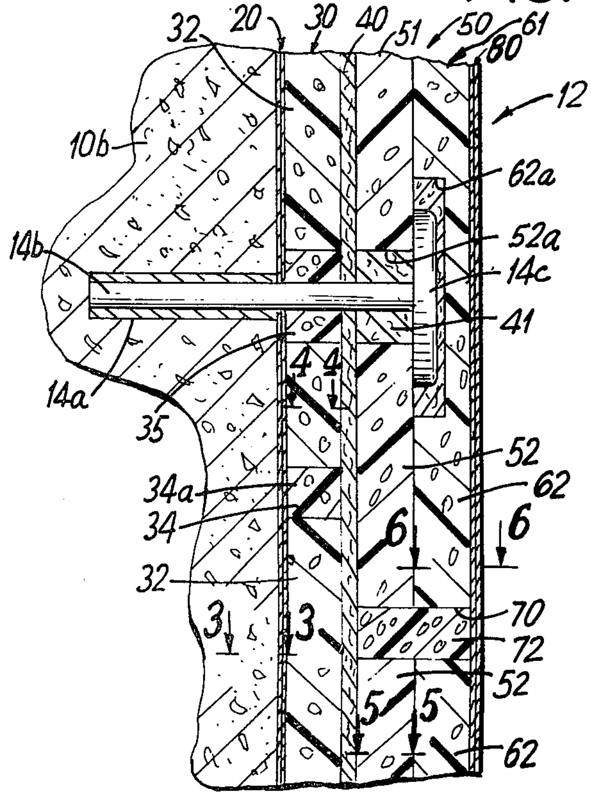
FIG. 2 is a fragmentary, enlarged, cross-sectional view taken along line 2—2 in FIG. 1.

The insulation system and the method of installation will now be described. With reference to FIGS. 1 and 2, the insulation system is supported from the tank by means of a plurality of fastener means 14 which include an anchor member 14a, embedded in the tank; a threaded rod 14b attached to anchor member 14a at one end and a nut 14c at its free end. Rod 14b and nut 14a are preferably plastic, but other substantially non-conducting materials may be utilized. A plurality of fastener means are utilized at spaced apart locations across the bottom 10a and sidewalls 10b of the tank.

The first step in installing the system is to set the anchor portions 14b in the desired location. The rods 14b may then be threaded into their respective anchor portions or the vapor barrier 20, to be described, may be installed, followed by insertion of the rods 14b.

Figure 3:
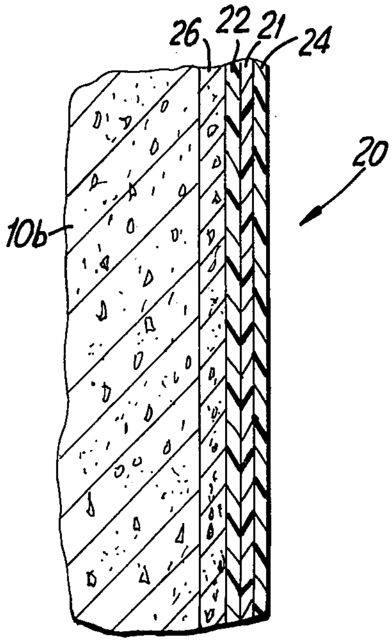
FIG. 3 is a fragmentary, enlarged, cross-sectional view taken along line 3—3 in FIG. 2 and illustrates the tank and tank membrane.

Vapor barrier 20, FIG. 3, is a composite membrane applied to the inner surface of the concrete. Barrier 20 is designed to prevent moisture inflow to the insulation, described below, and to prevent natural gas outflow to the concrete wall. Vapor barrier 20 includes a three layer composite, including a center layer of butyl elastomer (rubber) 21 sandwiched between an inner layer 22 and outer layer 24 of polyurethane elastomer. The barrier 20 is bonded to the tank by a layer of polyurethane foam or adhesive 26 on the free surface of layer 22. Adhesive layer 26 is shown partially impregnating the concrete in FIG. 3.

Figure 4:
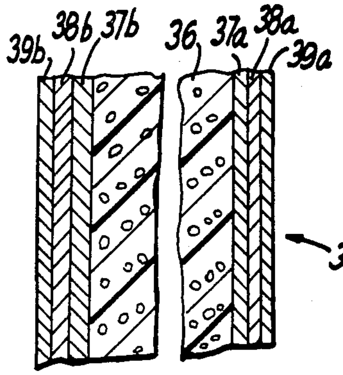
FIG. 4 is a fragmentary, enlarged, cross-sectional view taken along line 4—4 in FIG. 2 and illustrates the inner insulation panel.

After the vapor barrier 20 has been applied and rods 14b are set, a first composite layer 30 of insulation is applied. With reference to FIGS. 2 and 4, composite layer 30 is formed by a plurality of panels 32 which may be of generally curved rectangular, square, or other shape. Each panel 32 is set in spaced apart edge relationship to provide a gap area between the peripheries of each panel and the adjacent panels. These gaps 34 are filled with foamed-in-place polyurethane foam 34a to provide an integral layer 30. The panels are aperture to receive rod 14b therethrough and the void space between each rod and the panel is also filled with foamed-in-place polyurethane foam 35, see FIG. 2.

FIG. 4 illustrates the first composite layer of blanket 30. Blanket 30 includes a central core 36 of polyurethane foam of about 2 p.c.f. density, sandwiched between two layers 37a and 37b of aluminum foil, preferably 0.0035 inch in thickness; followed by two layers 38a and 38b of kraft paper; and finally two more layers 39a and 39b of aluminum foil, preferably about 0.0035 inch in thickness.

After insulation panel layer 30 has been installed, a fiberglass blanket 40 is applied to the surface of this layer, see FIG. 2. Fiberglass blanket 40 is suitably apertured to receive each of the rods 14*b* therethrough. Fiberglass blanket 40 permits independent relative movement of layer 30 and the composite insulation 50, described below, at the opposite surface of the blanket 40.

Figure 5:
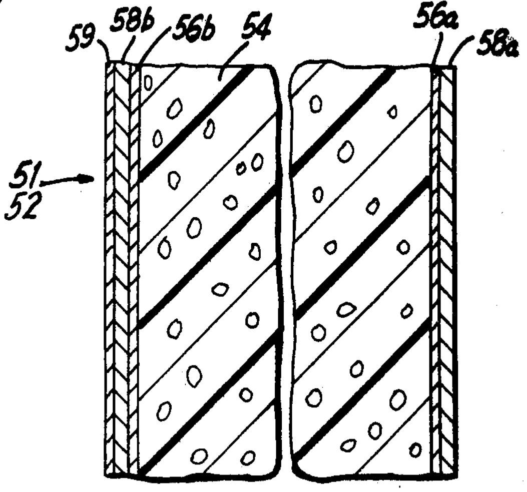
FIG. 5 is a fragmentary, enlarged, cross-sectional view taken along line 5—5 in FIG. 2 and illustrates the intermediate insulation panel.

Composite insulation 50 is advantageously formed of two layers 51 and 61 of composite blankets. The second composite layer 51 is best illustrated in FIG. 5. Layer 51 is formed by a plurality of panels 52 which may be rectangular, square or other shapes. Each panel 52 includes central core 54 of polyurethane foam of about 2 p.c.f. density. Each surface of core 54 is faced with a layer 56*a* and 56*b* of aluminum foil, about 0.0035 inch in thickness and a layer 58*a* and 58*b* of kraft paper. The paper layer 58*b* adjacent the fiberglass blanket 40 has an outer layer of aluminum foil 59.

Each panel 52 is provided with an enlarged aperture 52*a* for receipt of rod 14*b*, see FIG. 2. After each panel 52 is positioned on the tank surface, a fiberglass fill 41 is inserted into the interstices between aperture 52*a* and rod 14*b* to fill the void. Thereafter, plastic nut 14, which has a head diameter larger than aperture 52*a*, is threaded on rod 14*b* and into engagement with panel 52, more specifically kraft layer 58*a*.

Figure 6:
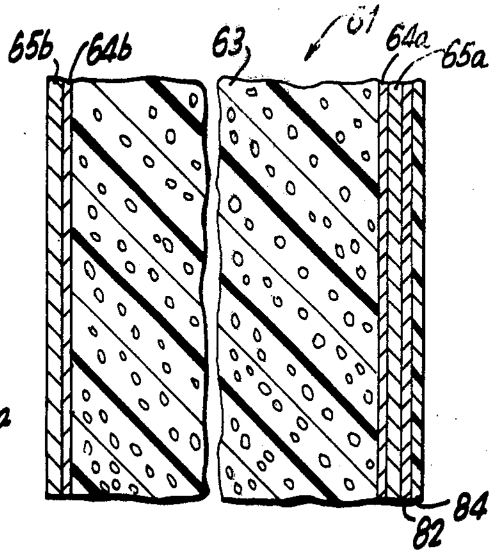
FIG. 6 is a fragmentary, enlarged, cross-sectional view taken along line 6—6 in FIG. 2 and illustrates the outer insulation panel and vapor membrane.

The third composite layer 61 is also formed of panels 62 having a shape corresponding to panels 52. With reference to FIG. 6, each panel 62 includes a central core 63 of polyurethane foam, sandwiched between layers, 64*a*, and 64*b* of aluminum foil, preferably 0.0035 inch in thickness, and outer layers 65*a* and 65*b* of kraft paper.

As best illustrated in FIGS. 1 and 2, each panel 62 is provided with a clearance cut out 62*a* for receipt of the associated nut 14*c* therein. The interstices between nut 14*b* and cut out 62*a* are filled with fiberglass matt. Panel 62 is bonded to panel 52 by a cryogenic adhesive, such as Crest Co. 7410 or others, applied therebetween, more specifically between kraft layers 58*a* and 65*b*. In this manner, panels 52 and 62 are structurally a one-piece element.

The panels 52 and 62 are of similar shape and dimensions and are set spaced from associated elements to provide a peripheral gap 70, see FIG. 2. After panel 62 has been bonded to panel 52, gap 70 is filled with foamed-in-place polyurethane foam 72 so that a continuous insulation barrier is provided. It will be noted that the gaps 70 are in off-set relationship with respect to the gaps 34.

The final component of the system is a membrane barrier 80, see FIGS. 2 and 6. Barrier 80 includes as a major component a layer 82 of aluminum foil at least 0.004 inch in thickness. Preferably, layer 82 is coated on the outer surface with a layer 84 of polyurethane elastomer or other cryogenic plastic. Layer 82 provides strength for the insulation system under hydrostatic pressure of the fluid and layer 84 acts as a protective layer against the elements. Membrane barrier 80 may be integrally formed or separately applied. Additionally, the barrier layer may be formed with panels 62.

Figure 7:
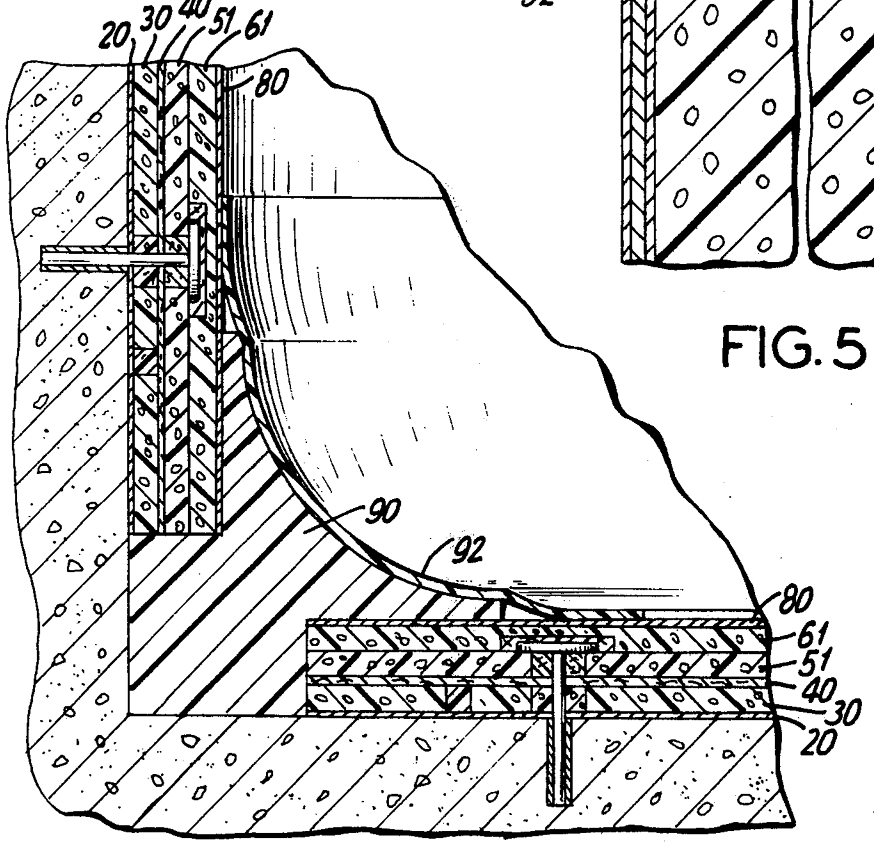
FIG. 7 is a fragmentary, vertical cross-section of the tank of FIG. 1 illustrating the corner structure.

After the installation of the insulation to the sidewalls and bottom of the tank, a corner member 90, see FIG. 7, is fabricated. A vapor and liquid membrane 92 is applied over corner member 90 and bonded to vapor membrane 80 of the bottom and sidewall.

The insulation system may be purged with nitrogen to prevent degradation from condensation. For this purpose, purge passages may be provided between membrane 20 and layer 30 or through the fiberglass layer 40.

From the above description, it will be appreciated by those skilled in the art that other modifications may be made to the present invention without departing from the scope and spirit thereof, as pointed out in the appended claims.

What is claimed is:

1. A method of insulating a cryogenic tank comprising the steps of:
   a. anchoring a plurality of elongate fasteners at predetermined intervals along the internal surface of said tank;
   b. applying a vapor barrier to said wall;
   c. setting a plurality of insulation panels in edge to edge relationship to form a first layer of insulation, said panels having holes arranged in said pre-determined intervals to receive said fasteners therein;
   d. positioning a blanket of fiberglass in overlying relationship with said first layer;
   e. setting a plurality of insulating panels in edge to edge relationship to form a second layer of insulation, said panels having holes arranged in said predetermined intervals to receive said fasteners therein, said fiberglass blanket permitting independent relative movement between said first and second layers;
   f. threading a nut on the end of each of said fasteners and into engagement with the free surface of said second layer to support the layers on the wall;
   g. applying a cryogenic adhesive to the free surface of said second layer;
   h. setting a plurality of insulating panels in edge to edge relationship in contact with said adhesive to form a third layer of insulation, the inner surface of said panels having clearance areas for said fastener nuts; and
   i. applying a barrier to the free surface of said third layer, said barrier being impervious to water vapor and cryogenic fluid.

2. A method of claim 1, wherein the interstices between the edges of the panels in said first layer and between said fasteners and said panel holes are filled with polyurethane foam.

3. A method of claim 1, wherein the panels are set such that the edges of the panels in said second and third layers are in offset relationship to the edges of the panels in said first layer.

4. A method of claim 1, wherein the interstices between the edges of the panels in said second and third layers are filled with polyurethane foam.

5. A method of claim 1, wherein the interstices between said fastener and said second and third layer panels are filled with fiberglass.

6. In a cryogenic tank an interior insulation system comprising:
   (i) a first barrier impervious to water vapor and cryogenic fluid joined to the inner surface of the wall of said tank;
   (ii) a first layer of insulation in contact with said barrier;
   (iii) a second and third layer of insulation, said second and third layers being bonded together;
   (iv) a fiberglass blanket interposed between said first and second layers of insulation said fiberglass blanket permitting independent relative movement between said first and second layers;

(v) a second barrier impervious to water vapor and cryogenic fluid covering the free surface of said third layer; and (vi) anchor means extending from said wall through said first and second layers for securing said system to the tank.

7. An insulation system of claim 6, wherein said first, second and third layers of insulation are cellular material and each include multiple panels of insulation arranged in edge-to-edge relationship in each layer and wherein the interstices between adjacent panel edges are filled with foamed-in-place cellular material of the same type.

8. An insulation system of claim 7, wherein the edges of the panels in said first layer are in offset relationship with respect to the edges of the panels in said second layer.

9. An insulation system of claim 8, wherein the edges of said second and third layer panels are in register.

10. An insulation system of claim 7, wherein the interstices between adjacent panel edges are filled with polyurethane foam.

11. An insulation system of claim 6, wherein said first and third layers of insulation are faced with kraft paper and a layer of aluminum foil interposed between the insulation layer and kraft paper.

12. An insulation system of claim 11, wherein said first barrier is a composite of two layers of polyurethane elastomer with an inner layer of butyl elastomer.

13. An insulation system of claim 11, wherein said second barrier includes a layer of aluminum foil in contact with said kraft paper at one surface and coated with polyurethane elastomer on its other surface.

14. An insulation system of claim 6, wherein said second barrier includes a layer of aluminum foil at least 0.004 inch in thickness.

* * * * *